(12) United States Patent
Shinkawa

(10) Patent No.: US 12,415,262 B2
(45) Date of Patent: Sep. 16, 2025

(54) SECONDARY BATTERY, BATTERY PACK, ELECTRONIC DEVICE, ELECTRIC TOOL, ELECTRIC AIRCRAFT, AND ELECTRIC VEHICLE

(71) Applicant: MURATA MANUFACTURING CO., LTD., Kyoto (JP)

(72) Inventor: Akira Shinkawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 793 days.

(21) Appl. No.: 17/580,958

(22) Filed: Jan. 21, 2022

(65) Prior Publication Data

US 2022/0149489 A1 May 12, 2022

Related U.S. Application Data

(63) Continuation of application No. PCT/JP2020/028457, filed on Jul. 22, 2020.

(30) Foreign Application Priority Data

Jul. 30, 2019 (JP) ................................. 2019-139815

(51) Int. Cl.
*B25F 5/00* (2006.01)
*B64C 27/00* (2006.01)
(Continued)

(52) U.S. Cl.
CPC ............... *B25F 5/00* (2013.01); *B64C 27/00* (2013.01); *B64D 27/34* (2024.01); *B64D 27/357* (2024.01);
(Continued)

(58) Field of Classification Search
CPC ... H01M 10/0587; H01M 50/531; B25F 5/00; B64D 27/34; B64D 27/357
See application file for complete search history.

(56) References Cited

U.S. PATENT DOCUMENTS

2005/0271933 A1 12/2005 Matsumoto et al.
2006/0024572 A1* 2/2006 Lee ................... H01M 10/0431
429/161
(Continued)

FOREIGN PATENT DOCUMENTS

JP 2006012801 A 1/2006
JP 2006032112 A 2/2006
(Continued)

OTHER PUBLICATIONS

International Search Report of corresponding PCT application PCT/JP2020/028457, dated Oct. 20, 2020.
Japanese Office Action issued Oct. 4, 2022 in corresponding Japanese Application No. 2021-536999.
Chinese Office Action issued Nov. 29, 2023 in corresponding Chinese Application No. 202080053618.8.

*Primary Examiner* — Karie O'Neill Apicella
(74) *Attorney, Agent, or Firm* — K&L Gates LLP

(57) ABSTRACT

Provided is a secondary battery, where a positive electrode includes a first covered part covered with a positive electrode active material layer and a positive electrode active material non-covered part on a positive electrode foil, and a negative electrode includes a second covered part covered with a negative electrode active material layer and a negative electrode active material non-covered part on a negative electrode foil, the positive electrode active material non-covered part is joined to a positive electrode current-collecting plate at one end of the electrode wound body, and the negative electrode active material non-covered part is joined to a negative electrode current-collecting plate at the other end of the electrode wound body.

15 Claims, 11 Drawing Sheets

(51) Int. Cl.

| | |
|---|---|
| *B64D 27/34* | (2024.01) |
| *B64D 27/357* | (2024.01) |
| *B64U 50/30* | (2023.01) |
| *H01M 10/0587* | (2010.01) |
| *H01M 50/531* | (2021.01) |
| *B64U 10/16* | (2023.01) |
| *B64U 30/20* | (2023.01) |

(52) U.S. Cl.
CPC ........ *B64U 50/30* (2023.01); *H01M 10/0587* (2013.01); *H01M 50/531* (2021.01); *B64U 10/16* (2023.01); *B64U 30/20* (2023.01); *H01M 2220/20* (2013.01); *H01M 2220/30* (2013.01)

(56) References Cited

U.S. PATENT DOCUMENTS

| | | | |
|---|---|---|---|
| 2015/0072204 A1* | 3/2015 | Kwon | H01M 50/538 429/94 |
| 2018/0351212 A1 | 12/2018 | Matsui et al. | |
| 2020/0203678 A1 | 6/2020 | Shinoda et al. | |

FOREIGN PATENT DOCUMENTS

| | | | | |
|---|---|---|---|---|
| JP | 2008166030 A | * | 7/2008 | ............ H01M 10/04 |
| JP | 2018206514 A | | 12/2018 | |
| JP | 2019061851 A | | 4/2019 | |

* cited by examiner

SECONDARY BATTERY, BATTERY PACK, ELECTRONIC DEVICE, ELECTRIC TOOL, ELECTRIC AIRCRAFT, AND ELECTRIC VEHICLE

CROSS REFERENCE TO RELATED APPLICATIONS

The present application is a continuation of PCT patent application no. PCT/JP2020/028457, filed on Jul. 22, 2020, which claims priority to Japanese patent application no. JP2019-139815 filed on Jul. 30, 2019, the entire contents of which are being incorporated herein by reference.

BACKGROUND

The present disclosure generally relates to a secondary battery, a battery pack, an electronic device, an electric tool, an electric aircraft, and an electric vehicle.

High-power batteries are required for automobiles, machines, tools, and the like. As a method for producing high power, high-rate discharge for the flow of a relatively large current from a battery has been proposed. The high-rate discharge has a problem with the internal resistance of the battery, because of the flow of the large current.

SUMMARY

The present disclosure generally relates to a secondary battery, a battery pack, an electronic device, an electric tool, an electric aircraft, and an electric vehicle.

The conventional battery may has a problem of failing to achieve welding in some cases.

Accordingly, an object of the present disclosure is to provide a battery that has a current collector plate and a foil exposed part (active material non-covered part) reliably joined.

For solving the above-described problems, the present disclosure provides a secondary battery according to an embodiment including: an electrode wound body that has a positive electrode and a negative electrode stacked with a separator interposed therebetween and has a wound structure; and a positive electrode current-collecting plate and a negative electrode current-collecting plate, accommodated in an exterior can,
where the positive electrode includes a first covered part covered with a positive electrode active material layer and a positive electrode active material non-covered part on a positive electrode foil,
the negative electrode includes a second covered part covered with a negative electrode active material layer and a negative electrode active material non-covered part on a negative electrode foil,
the positive electrode active material non-covered part is joined to the positive electrode current-collecting plate at one end of the electrode wound body,
the negative electrode active material non-covered part is joined to the negative electrode current-collecting plate at the other end of the electrode wound body,
one or both of the positive electrode active material non-covered part and the negative electrode active material non-covered part have a surface formed by bending toward the central axis of the wound structure and overlapping each other,
the surface has grooves,
the surface located between the adjacent grooves has a raised part, and
at the raised part, at least the positive electrode active material non-covered part is joined to the positive electrode current-collecting plate or the negative electrode active material non-covered part is joined to the negative electrode current-collecting plate.

Further, the present disclosure provides a battery pack including:
the secondary battery described above;
a controller configured to control the secondary battery; and
an exterior body that encloses the secondary battery.

The present disclosure provides an electronic device according to an embodiment including the secondary battery as described herein or the battery pack as described herein.

The present disclosure provides an electric tool according to an embodiment including the battery pack as described herein. The electric tool is configured to use the battery pack as a power supply.

The present disclosure provides an electric aircraft according to an embodiment including:
the battery pack as described herein;
a plurality of rotor blades;
a motor that rotates each of the rotor blades;
a support shaft that supports each of the rotor blades and the motor;
a motor controller configured to control rotation of the motor; and
a power supply line that supplies power to the motor,
where the battery pack is connected to the power supply line.

The present disclosure provides an electric vehicle according to an embodiment including the secondary battery described above, and
including a conversion device that receives power supply from the secondary battery to convert the power to a driving force for the electric vehicle, and
a controller configured to perform information processing related to vehicle control, based on information on the second battery.

According to at least an embodiment of the present disclosure, the active material non-covered part and the current-collecting plate can be reliably welded, the internal resistance of the battery can be reduced, or a high-power battery can be achieved.

It is to be noted that the contents of the present disclosure are not to be construed as being limited by the effects illustrated in this specification. It should be understood that the effects described in the present specification are only examples, and additional effects may be further provided.

DETAILED DESCRIPTION

As described herein, the present disclosure will be described based on examples with reference to the drawings, but the present disclosure is not to be considered limited to the examples, and various numerical values and materials in the examples are considered by way of example.

In the embodiment of the present disclosure, a cylindrical lithium ion battery will be described as an example of the secondary battery. Obviously, any battery other than the lithium ion battery or a battery that has any shape other than the cylindrical shape may be used.

Figure 1:
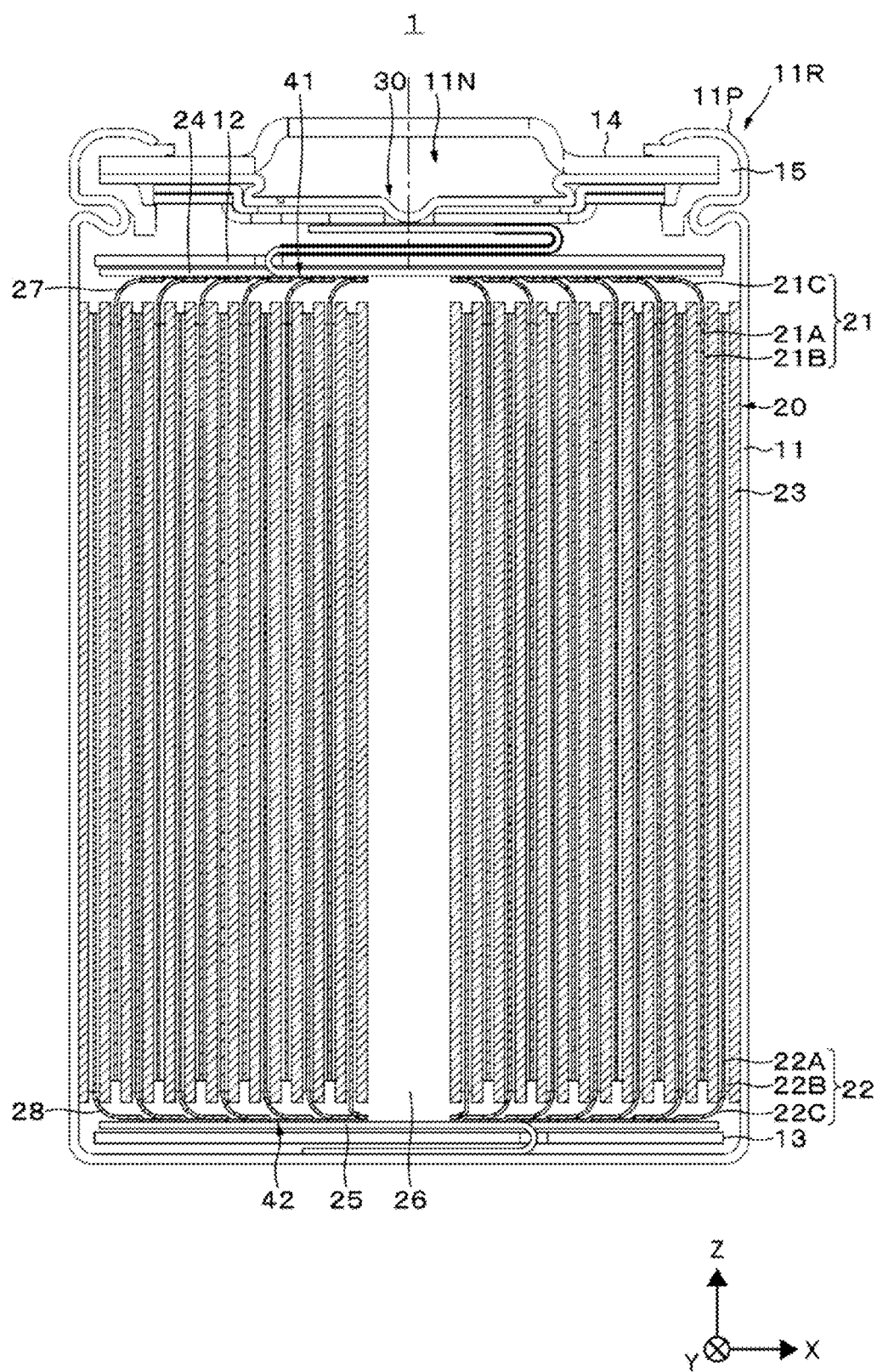
FIG. 1 is a sectional view of a battery according to an embodiment of the present disclosure.

First, the overall configuration of the lithium ion battery will be described. FIG. 1 is a schematic sectional view of a lithium ion battery 1. The lithium ion battery 1 is, for example, a cylindrical lithium ion battery 1 that has an electrode wound body 20 is housed inside an exterior can 11 as shown in FIG. 1.

Specifically, the lithium ion battery 1 includes, for example, a pair of insulating plates 12 and 13 and an electrode wound body 20 inside the cylindrical exterior can 11. The lithium ion battery 1 may further, however, include, for example, any one of, or two or more of a positive temperature coefficient (PTC) element, a reinforcing member, and the like inside the exterior can 11.

The exterior can 11 is a member that mainly houses the electrode wound body 20. The exterior can 11 is, for example, a cylindrical container with one end thereof opened and the other end thereof closed. More specifically, the exterior can 11 has an opened end (open end 11N). The exterior can 11 contains, for example, any one of, or two or more of metal materials such as iron, aluminum, and alloys thereof. The surface of the exterior can 11 may be, however, plated with, for example, any one of, or two or more of metal materials such as nickel.

Each of the insulating plates 12 and 13 is, for example, a dish-shaped plate that has a surface perpendicular to the winding axis of the electrode wound body 20, that is, a surface perpendicular to the Z axis in FIG. 1. In addition, the insulating plates 12 and 13 are disposed so as to sandwich the electrode wound body 20 therebetween, for example.

The open end 11N of the exterior can 11 has, for example, a battery cover 14 and a safety valve mechanism 30 are crimped with a gasket 15. The battery cover 14 serves as a "cover member" according to an embodiment of the present disclosure, and the gasket 15 serves as a "sealing member" according to an embodiment of the present disclosure. Thus, with the electrode wound body 20 and the like housed inside the exterior can 11, the exterior can 11 is sealed. Accordingly, the open end 11N of the exterior can 11 has a crimped structure (crimped structure 11R) formed by the battery cover 14 and the safety valve mechanism 30 crimped with the gasket 15. More specifically, a bent part 11P is a so-called crimp part, and the crimped structure 11R is a so-called crimp structure.

The battery cover 14 is a member that closes the open end 11N of the exterior can 11 mainly with the electrode wound body 20 and the like housed inside the exterior can 11. The battery cover 14 contains, for example, the same material as the material that forms the exterior can 11. The central region of the battery cover 14 protrudes in the +Z direction, for example. Thus, the region (peripheral region) of the battery cover 14 other than the central region has contact with, for example, the safety valve mechanism 30.

The gasket 15 is a member mainly interposed between the exterior can 11 (bent part 11P) and the battery cover 14 to seal the gap between the bent part 11P and the battery cover 14. For example, asphalt or the like may be, however, applied to the surface of the gasket 15.

The gasket 15 contains, for example, any one of, or two or more of insulating materials. The types of the insulating materials are not particularly limited, and may be, for example, a polymer material such as a polybutylene terephthalate (PBT) and a polypropylene (PP). In particular, the insulating material is preferably a polybutylene terephthalate. This is because the gap between the bent part 11P and the battery cover 14 is sufficiently sealed while the exterior can 11 and the battery cover 14 are electrically separated from each other.

The safety valve mechanism 30 mainly releases the sealed state of the exterior can 11 to release the pressure (internal pressure) inside the exterior can 11, if necessary, when the internal pressure is increased. The cause of the increase in the internal pressure of exterior can 11 is, for example, a gas generated due to a decomposition reaction of an electrolytic solution during charging or discharging.

For the cylindrical lithium ion battery, a band-shaped positive electrode 21 and a band-shaped negative electrode 22 are spirally wound with a separator 23 interposed therebetween, impregnated with an electrolytic solution, and housed in the exterior can 11. The positive electrode 21 is obtained by forming a positive electrode active material layer 21B on one or both surfaces of a positive electrode foil 21A, and the material of the positive electrode foil 21A is, for example, a metal foil made of aluminum or an aluminum alloy. The negative electrode 22 is obtained by forming a negative electrode active material layer 22B on one or both surfaces of a negative electrode foil 22A, and the material of the negative electrode foil 22A is, for example, a metal foil made of nickel, a nickel alloy, copper, or a copper alloy. The separator 23 is a porous and insulating film, which enables transfer of substances such as ions and an electrolytic solution while electrically insulating the positive electrode 21 and the negative electrode 22.

The positive electrode active material layer 21B and the negative electrode active material layer 22B respectively cover most of the positive electrode foil 21A and the negative electrode foil 22A, but intentionally, neither of the layers covers one end periphery in the short axis direction of the band. Hereinafter, the part covered with no active material layer 21B or 22B is appropriately referred to as an active material non-covered part. In the cylindrical battery, the electrode wound body 20 is wound in such a manner that an active material non-covered part 21C of the positive electrode and an active material non-covered part 22C of the negative electrode are overlapped with each other with the separator 23 interposed therebetween so as to face in opposite directions.

Figure 2:
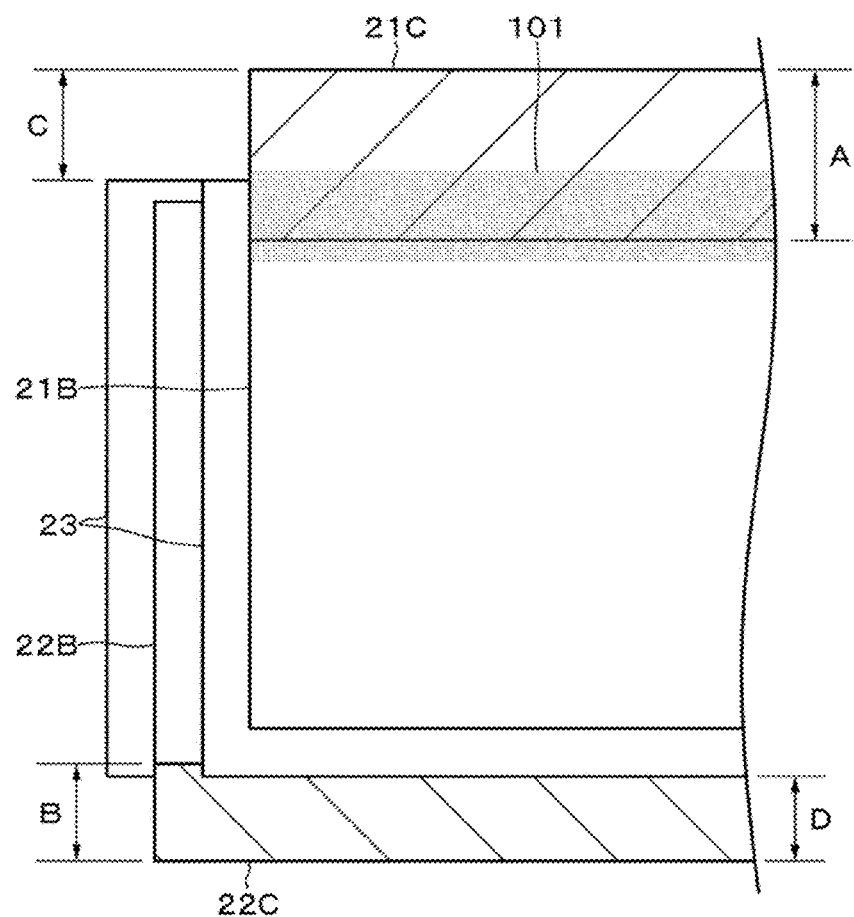
FIG. 2 is a diagram illustrating an example of a relationship among a positive electrode, a negative electrode, and a separator disposed in an electrode wound body according to an embodiment of the present disclosure.

FIG. 2 shows an example of a structure with the positive electrode 21, the negative electrode 22, and the separator 23 stacked before winding. The active material non-covered part 21C (the upper hatched part in FIG. 2) of the positive electrode has a width denoted by A, and the active material non-covered part 22C (the lower hatched part in FIG. 2) of the negative electrode has a width denoted by B. According to one embodiment, A>B is preferred, for example, A=7 (mm) and B=4 (mm). A part of the active material non-covered part 21C of the positive electrode, protruded from one end of the separator 23 in the width direction, has a length denoted by C, and a part of the active material non-covered part 22C of the negative electrode, protruded from the other end of the separator 23 in the width direction, has a length denoted by D. According to one embodiment, C>D is preferred, for example, C=4.5 (mm) and D=3 (mm).

The active material non-covered part 21C of the positive electrode is made of, for example, aluminum, whereas the active material non-covered part 22C of the negative electrode is made of, for example, copper, and thus, the active material non-covered part 21C of the positive electrode is typically softer (has a lower Young's modulus) than the active material non-covered part 22C of the negative electrode. Thus, according to one embodiment, A>B and C>D are more preferred, and in this case, when the active material non-covered part 21C of the positive electrode and the active material non-covered part 22C of the negative electrode are bent at the same pressure simultaneously from both electrode sides, the positive electrode 21 and the negative electrode 22 may be similar in the height of the bent part, measured from the tip of the separator 23. In this case, the active material non-covered parts 21C and 22C are bent to appropriately overlap with each other, thus allowing the active material non-covered parts 21C and 22C and current-collecting plates 24 and 25 to be easily joined by laser welding. Joining according to one embodiment means joining by laser welding, but the joining method is not limited to laser welding.

For the positive electrode 21, a section of 3 mm in width, including the boundary between the active material non-covered part 21C and the active material covered part 21B, is coated with an insulating layer 101 (gray region part in FIG. 2). Further, the whole region of the active material non-covered part 21C of the positive electrode, opposed the active material covered part 22B of the negative electrode with the separator interposed therebetween, is covered with the insulating layer 101. The insulating layer 101 has the effect of reliably preventing any internal short circuit of the battery 1 if any foreign matter enters between the active material covered part 22B of the negative electrode and the active material non-covered part 21C of the positive electrode. In addition, the insulating layer 101 has the effect of, when an impact is applied to the battery 1, absorbing the impact and reliably preventing the active material non-covered part 21C of the positive electrode from being bent or short-circuited with the negative electrode 22.

The central axis of the electrode wound body 20 has a through hole 26 formed. The through hole 26 is a hole for insertion of a winding core for assembling the electrode wound body 20 and an electrode rod for welding. The electrode wound body 20 is wound in an overlapping manner such that the active material non-covered part 21C of the positive electrode and the active material non-covered part 22C of the negative electrode face in the opposite directions, and thus, the active material non-covered part 21C of the positive electrode is gathered at one (end 41) of the ends of the electrode wound body 20, whereas the active material non-covered part 22C of the negative electrode is gathered at the other (end 42) of the ends of the electrode wound body 20. For improving contact with the current-collecting plates 24 and 25 for current extraction, the active material non-covered parts 21C and 22C are bent, and the ends 41 and 42 have surfaces formed as flat surfaces. The bending directions are directions from the outer edges 27 and 28 of the ends 41 and 42 toward the through hole 26, and peripheral active material non-covered parts that are adjacent in the wound state are bent in a manner of overlapping with each other. In this specification, the "flat surface" includes not only a perfectly flat surface but also a surface with some unevenness and surface roughness to the extent that the active material non-covered part and the current collecting plate can be joined.

When each of the active material non-covered parts 21C and 22C are bent so as to have an overlap, it seems possible for the surfaces of the ends 41 and 42 to have flat surfaces, but if no processing is performed before bending, wrinkles or voids (voids, spaces) are generated at the ends 41 and 42 at the time of bending, and the surfaces of the ends 41 and 42 have no flat surfaces. In this regard, the "wrinkles" or "voids" are portions where the bent active material non-covered parts 21C and 22C are biased, thereby causing the surfaces or the ends 41 and 42 to have no flat surfaces. For preventing the generation of wrinkles and voids, grooves 43 (see, for example, FIG. 4B) are formed in radiation directions from the through hole 26. The groove 43 extends from the outer edges 27 and 28 of the ends 41 and 42 to the through hole 26 in the central axis. The central axis of the electrode wound body 20 has the through hole 26, and the through hole 26 is used as a hole into which a welding tool is inserted in the process of assembling the lithium ion battery 1. The active material non-covered parts 21C and 22C have notches at the start of winding the positive electrode 21 and the negative electrode 22 near the through hole 26. This is for keeping the through hole 26 from being closed in the case of bending toward the through hole 26. The grooves 43 remain in the flat surfaces also after bending the active material non-covered parts 21C and 22C, and parts without the grooves 43 are joined (welded or the like) to the positive electrode current-collecting plate 24 or the negative electrode current-collecting plate 25. It is to be noted that the grooves 43 as well as the flat surfaces may be joined to a part of the current-collecting plates 24 and 25.

The detailed configuration of the electrode wound body 20, that is, the respective detailed configuration of the positive electrode 21, negative electrode 22, separator 23, and electrolytic solution will be described later.

Although the active material non-covered parts 21C and 22C are described as being bent at the surfaces of the ends 41 and 42 to form flat surfaces, the flat surfaces are actually not perfectly flat surfaces, and the part between adjacent grooves 43 has a raised part 44 (see FIG. 6B) where the ends 41 and 42 are slightly raised. Accordingly, the success rate of laser welding to the current-collecting plates 24 and 25 varies depending on the positions of the ends 41 and 42. This will be described in an example.

In a common lithium ion battery, for example, a lead for current extraction is welded to each one of the positive electrode and negative electrode, but this is not suitable for high-rate discharge because of the high internal resistance of the battery and the temperature increased by heat generation of the lithium ion battery in the case of discharging. Thus, in the lithium ion battery according to one embodiment, the internal resistance of the battery is kept low by disposing the positive electrode current-collecting plate 24 and the negative electrode current-collecting plate 25 at the ends 41 and 42, and welding at multiple points to the active material non-covered parts 21C and 22C of the positive electrode and negative electrode present at the ends 41 and 42. The ends 41 and 42 are bent to form substantially flat surfaces, which also contributes to the reduction in resistance.

Figure 3A:
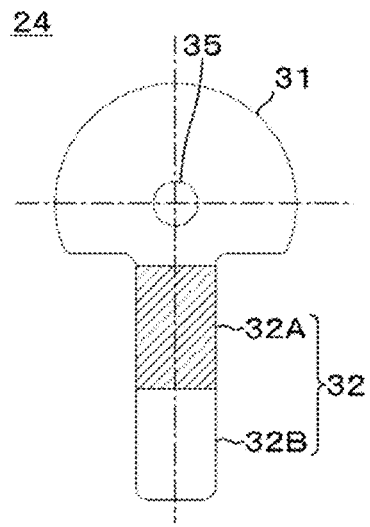
FIG. 3A is a plan view of a positive electrode current-collecting plate according to an embodiment of the present disclosure.
Figure 3B:
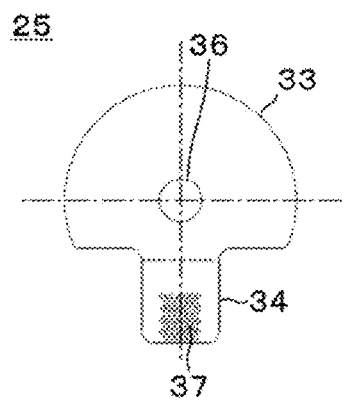
FIG. 3B is a plan view of a negative electrode current-collecting plate according to an embodiment of the present disclosure.

FIG. 3A and FIG. 3B show examples of the current-collecting plates. FIG. 3A shows the positive electrode current-collecting plate 24, and FIG. 3B shows the negative electrode current-collecting plate 25. The material of the positive electrode current-collecting plate 24 is, for example, a metal plate made of a simple substance of aluminum or an aluminum alloy or a composite thereof, and the material of the negative electrode current-collecting plate 25 is, for example, a metal plate made of a simple substance of nickel, a nickel alloy, copper, or a copper alloy or a composite thereof. As shown in FIG. 3A, the positive electrode current-collecting plate 24 has the shape of a flat fan-shaped part 31 with a rectangular band-shaped part 32 attached thereto. The fan-shaped part 31 has, near the center thereof, a hole 35 formed, and the hole 35 is located at a position corresponding to the through hole 26.

A hatched part in FIG. 3A is an insulating part 32A where an insulating tape is attached to the band-shaped part 32 or an insulating material is applied thereto, and the part below the hatched part in the drawing is a connecting part 32B to a sealing plate that also serves as an external terminal. It is to be noted that in the case of a battery structure without any metallic center pin (not shown) in the through hole 26, the band-shaped part 32 has a low probability of coming into contact with a site with a negative electrode potential, and thus, there is no need for the insulating part 32A. In such a case, the widths of the positive electrode 21 and negative electrode 22 can be increased by an amount corresponding to the thickness of the insulating part 32A to increase the charge/discharge capacity.

The negative electrode current-collecting plate 25 has substantially the same shape as the positive electrode current-collecting plate 24, but has a different band-shaped part. The band-shaped part 34 of the negative electrode foil in FIG. 3B is shorter than the band-shaped part 32 of the positive electrode foil, without any part corresponding to the insulating part 32A. The band-shaped part 34 has a round protrusion (projection) 37 indicated by a plurality of circles. During resistance welding, current is concentrated on the protrusion, and the protrusion is melted to weld the band-shaped part 34 to the bottom of the exterior can 11. Similarly to the positive electrode current-collecting plate 24, the negative electrode current-collecting plate 25 has a hole 36 near the center of a fan-shaped part 33, and the hole 36 is located at a position corresponding to the through hole 26. The fan-shaped part 31 of the positive electrode current-collecting plate 24 and the fan-shaped part 33 of the negative electrode current-collecting plate 25 have a fan shape, and thus cover a part of the ends 41 and 42. The reason that the whole is not covered is to allow an electrolytic solution to smoothly permeate the electrode wound body in the assembly of the battery, or to make it easier for the gas generated when the battery reaches an abnormally high-temperature state or overcharge state to be released to the outside of the battery.

The positive electrode active material layer 21B includes, as a positive electrode active material, any one of, or two or more of positive electrode materials capable of occluding and releasing lithium. However, the positive electrode active material layer 21B may further include any one of, or two or more of other materials such as a positive electrode binder and a positive electrode conductive agent. The positive electrode material is preferably a lithium-containing compound, and more specifically, is preferably a lithium-containing composite oxide, a lithium-containing phosphate compound, or the like.

The lithium-containing composite oxide is an oxide containing lithium and one, or two or more other elements (elements other than lithium) as constituent elements, and the oxide has, for example, any of a layered rock salt-type crystal structure, a spinel-type crystal structure, and the like. The lithium-containing phosphate compound is a phosphate compound containing lithium and one, or two or more other elements as constituent elements, and the compound has an olivine-type crystal structure or the like.

The positive electrode binder includes any one of, or two or more of synthetic rubbers and polymer compounds, for example. The synthetic rubbers may be, for example, styrene-butadiene rubbers, fluorine rubbers, ethylene propylene diene, and the like. Examples of the polymer compounds include a polyvinylidene fluoride and a polyimide.

The positive electrode conductive agent includes, for example, any one of, or two or more of carbon materials and the like, for example. The carbon materials may be, for example, graphite, carbon black, acetylene black, Ketjen black, and the like. The positive electrode conductive agent may be, however, a metal material, a conductive polymer, or the like as long as the agent is a conductive material.

The surface of the negative electrode foil 22A is preferably roughened. This is because the adhesion of the negative electrode active material layer 22B to the negative electrode foil 22A is improved due to a so-called anchor effect. In this case, the surface of the negative electrode foil 22A has only to be roughened at least in a region opposed to the negative electrode active material layer 22B. The roughening method is, for example, a method such as forming fine particles through the use of electrolytic treatment. The electrolytic treatment provides the surface of the negative electrode foil 22A with irregularities, because fine particles are formed on the surface of the negative electrode foil 22A with an electrolytic method in an electrolytic cell. Copper foil prepared by an electrolytic method is generally referred to as electrolytic copper foil.

The negative electrode active material layer 22B includes, as a negative electrode active material, any one of, or two or more of negative electrode materials capable of occluding and releasing lithium. The negative electrode active material layer 22B may, however, further include any one of, or two or more of other materials such as a negative electrode binder and a negative electrode conductive agent.

The negative electrode material is, for example, a carbon material. This is because a high energy density can be stably achieved due to the very small change in crystal structure at the time of occlusion and release of lithium. In addition, this is because the carbon materials also function as negative electrode conductive agents, thus improving the conductivity of the negative electrode active material layer 22B.

The carbon materials may be, for example, graphitizable carbon, non-graphitizable carbon, and graphite. However, the interplanar spacing of the (002) plane in the non-graphitizable carbon is preferably 0.37 nm or more, and the interplanar spacing of the (002) plane in the graphite is preferably 0.34 nm or less. More specifically, the carbon materials may be, for example, pyrolytic carbons, coke, glassy carbon fibers, fired products of organic polymer compounds, activated carbon, and carbon blacks. Examples of the coke include pitch coke, needle coke, and petroleum coke. The fired products of organic polymer compounds are obtained by firing (carbonizing) polymer compounds such as a phenol resin and a furan resin at appropriate temperatures. Besides, the carbon materials may be low-crystallinity carbon subjected to a heat treatment at a temperature of about 1000° C. or lower, or may be amorphous carbon. It is to be noted that the shapes of the carbon materials may be any of fibrous, spherical, granular and scaly.

In the lithium ion battery 1, when the open-circuit voltage (that is, the battery voltage) in a fully charged case is 4.25 V or higher, the release amount of lithium per unit mass is increased also with the use of the same positive electrode active material as compared with a case where the open-circuit voltage in the fully charged case is 4.20 V, and the amount of the positive electrode active material and the amount of the negative electrode active material are thus adjusted accordingly. Thus, a high energy density is achieved.

The separator 23 is interposed between the positive electrode 21 and the negative electrode 22 to allow passage of lithium ions while preventing a short circuit due to the current caused by the contact between the positive electrode 21 and the negative electrode 22. The separator 23 is any one of, or two or more of porous membranes such as synthetic resins and ceramics, for example, and may be a laminated film of two or more porous membranes. The synthetic resins may be, for example, polytetrafluoroethylene, polypropylene, polyethylene, and the like.

In particular, the separator 23 may include, for example, the above-mentioned porous film (substrate layer), and a polymer compound layer provided on one or both sides of the substrate layer. This is because the adhesion of the separator 23 to each of the positive electrode 21 and the negative electrode 22 is improved, thus keeping the electrode wound body 20 from warping. Thus, the inhibited decomposition reaction of the electrolytic solution, and also, the suppressed leakage of the electrolytic solution with which the substrate layer impregnated, make the resistance less likely to increase also with repeated charging/discharging, and keep the secondary battery from swelling.

The polymer compound layer contains, for example, a polymer compound such as a polyvinylidene fluoride. This is because the polymer compound is excellent in physical strength and electrochemically stable. The polymer compound may be, however, a compound other than a polyvinylidene fluoride. In the case of forming the polymer compound layer, for example, a solution in which a polymer compound is dissolved in an organic solvent or the like is applied to the substrate layer, and then the substrate layer is dried. It is to be noted that after immersing the substrate layer in the solution, the base material layer may be dried. This polymer compound layer may include any one of, or two or more of insulating particles such as inorganic particles, for example. The type of the inorganic particles is, for example, an aluminum oxide, an aluminum nitride, or the like.

The electrolytic solution includes a solvent and an electrolyte salt. The electrolytic solution may further include, however, any one of, or two or more of other materials such as additives.

The solvent includes any one of, or two or more of nonaqueous solvents such as organic solvents. The electrolytic solution including a nonaqueous solvent is a so-called nonaqueous electrolytic solution.

The nonaqueous solvent is, for example, a cyclic carbonate, a chain carbonate, a lactone, a chain carboxylate, a nitrile (mononitrile), or the like.

The electrolyte salt includes any one of, or two or more of salts such as lithium salts, for example. However, the electrolyte salt may contain a salt other than lithium salts, for example. The salt other than lithium may be, for example, salts of light metals other than lithium.

The lithium salt may be, for example, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SF_6$), lithium chloride (LiCl) and Lithium bromide (LiBr), and the like.

Above all, any one of, or two or more of lithium hexafluorophosphate, lithium tetrafluoroborate, lithium perchlorate, and lithium hexafluoroarsenate is preferred, and lithium hexafluorophosphate is more preferred.

The content of the electrolyte salt is not particularly limited, but preferably 0.3 mol/kg to 3 mol/kg with respect to the solvent.

Figure 4F:
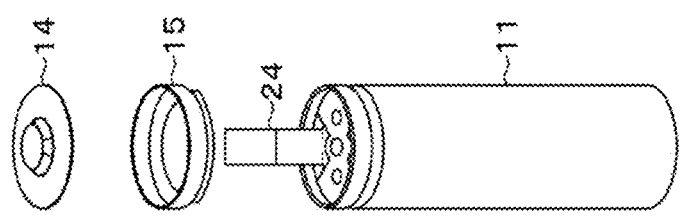
FIG. 4A to 4F are diagrams illustrating a process for assembling a battery according to an embodiment of the present disclosure.
Figure 4E:
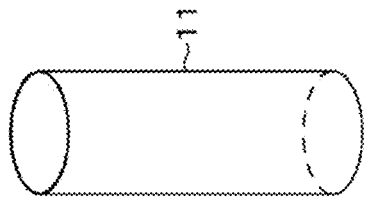
Figure 4D:
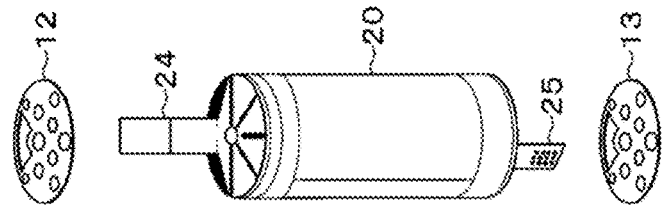
Figure 4C:
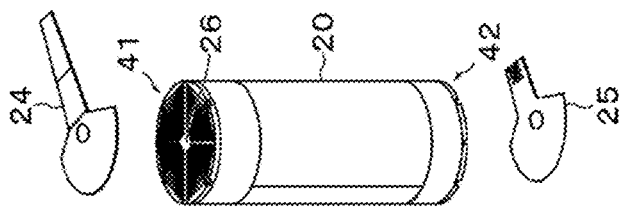

A method for manufacturing the lithium ion battery 1 according to one embodiment will be described with reference to FIG. 4A to FIG. 4F. First, a positive electrode active material was applied to the surface of the band-shaped positive electrode foil 21A to form a covered part for the positive electrode 21, and a negative electrode active material was applied to the surface of the band-shaped negative electrode foil 22A to form a covered part for the negative electrode 22. In this case, the active material non-covered parts 21C and 22C without the positive electrode active material or negative electrode active material applied were prepared at one end of the positive electrode 21 in the widthwise direction and one end of the negative electrode 22 in the widthwise direction. Notches were formed in parts of the active material non-covered parts 21C and 22C, corresponding to the winding starts at the time of winding. The positive electrode 21 and the negative electrode 22 were subjected to steps such as drying. Then, the electrodes were stacked with the separator 23 interposed therebetween such that the active material non-covered part 21C of the positive electrode and the active material non-covered part 22C of the negative electrode were oriented in opposite directions, and spirally wound so as to form the through hole 26 in the central axis and dispose the formed notches near the central axis, thereby preparing the electrode wound body 20 as shown in FIG. 4A.

Figure 4B:
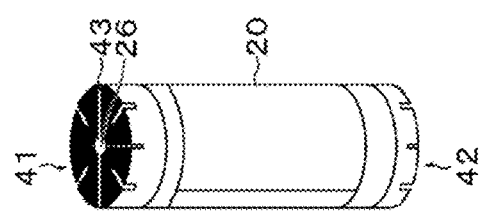
Figure 4A:
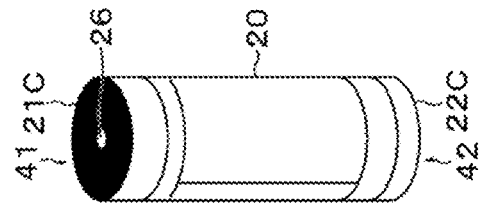

Next, as shown in FIG. 4B, an end of a thin flat plate (for example, 0.5 mm in thickness) or the like was pressed perpendicularly to the ends 41 and 42 to locally bend the ends 41 and 42 and then prepare the grooves 43. In accordance with this method, the groove 43 extending toward the central axis was prepared in radiation directions from the through hole 26. The number of the grooves 43 and the arrangement, shown in FIG. 4B, is considered by way of example only. Then, as shown in FIG. 4C, the same pressure was applied simultaneously from both electrode sides in a direction substantially perpendicular to the ends 41 and 42 to bend the active material non-covered part 21C of the positive electrode and the active material non-covered part 22C of the negative electrode, and then form the surfaces of the ends 41 and 42 so as to have substantially flat surfaces. In this case, the pressure was applied such that the active material non-covered parts at the ends 41 and 42 overlapped and then bent toward the through hole 26. Thereafter, the fan-shaped part 31 of positive electrode current-collecting plate 24 was subjected to laser welding to the end 41, and the fan-shaped part 33 of the negative electrode current-collecting plate 25 was subjected to laser welding to the end 42.

Thereafter, as shown in FIG. 4D, the band-shaped parts 32 and 34 of the current-collecting plates 24, 25 were bent, and the insulating plates 12 and 13 (or insulating tapes) were attached to the positive electrode current-collecting plate 24 and the negative electrode current-collecting plate 25, the electrode wound body 20 assembled as mentioned above was inserted into the exterior can 11 shown in FIG. 4E, and the bottom of the exterior can 11 was subjected to welding. After injecting an electrolytic solution into the exterior can 11, sealing was performed with the gasket 15 and the battery cover 14 as shown in FIG. 4F.

EXAMPLES

Hereinafter, the present disclosure will be specifically described with reference to an example based on the lithium ion battery 1 prepared in the manner described above, where the active material non-covered part 21C and positive electrode current-collecting plate 24 of the positive electrode were laser-welded, whereas the active material non-covered part 22C and negative electrode current-collecting plate 25 of the negative electrode were laser-welded. It is to be noted that the present disclosure is not to be considered limited to the examples described below.

The number of grooves 43 was 8, the thickness of the positive electrode foil was adjusted to 10 (μm), the thickness of the negative electrode foil was adjusted to 10 (μm), the thickness of the positive electrode current-collecting plate was adjusted to 200 (μm), and the thickness of the negative electrode current-collecting plate was adjusted to 80 (μm). The battery size was 21700. Except for Comparative Example 3, the numbers of overlapped sheets of the active material non-covered parts 21C and 22C bent at the end portions 41 and 42 were each 2 or more. The width A of the active material non-covered part 21C of the positive electrode was adjusted to 7 (mm), the width B of the active material non-covered part 22C of the negative electrode was adjusted to 4 (mm), the length C of the active material non-covered part 21C of the positive electrode, protruded from the separator 23, was adjusted to 4.5 (mm), and the length D of the active material non-covered part 22C of the negative electrode, protruded from the separator 23, was subjected to 3 (mm).

Figure 5:
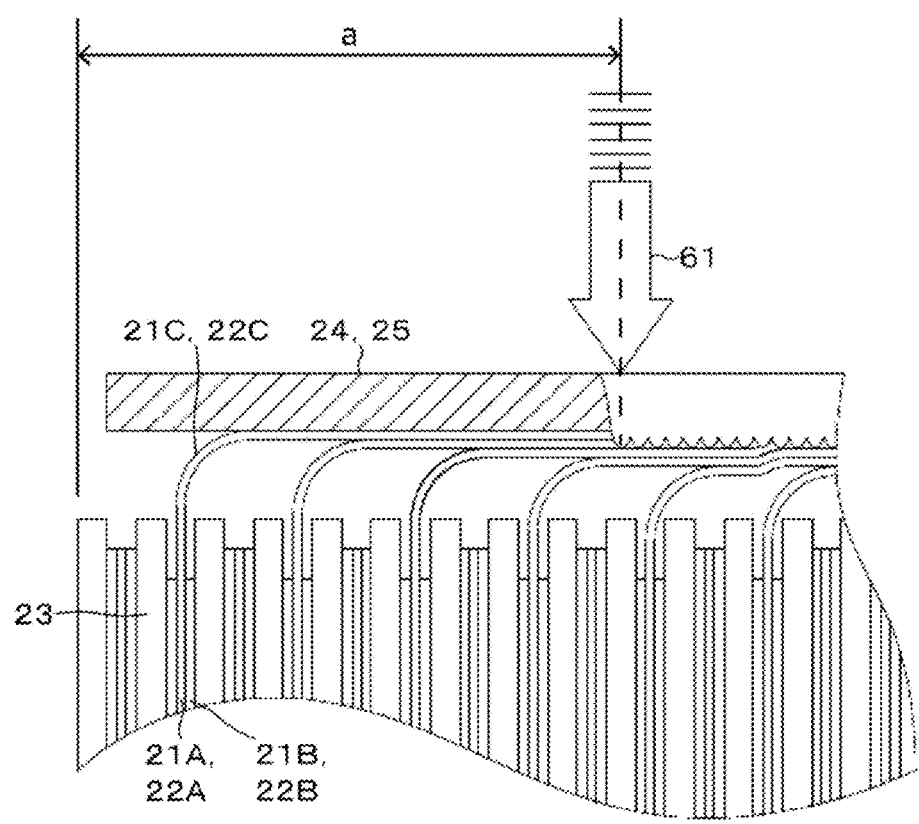
FIG. 5 is a diagram for illustrating laser welding and the number of overlapped sheets according to an embodiment of the present disclosure.

FIG. 5 shows a section of a laser-welded part of the positive electrode active material non-covered part 21C and of the positive electrode current-collecting plate 24. In the end portion 41, welding was performed by irradiating laser light 61 in a predetermined range from a point at a distance a from the side surface of the electrode wound body. The number m of sheets overlapped on the positive electrode side is the number of the active material non-covered parts 21C (positive electrode foils) welded immediately below the point at the distance a in FIG. 5. The point of the distance a is a point farthest from the central axis in the trajectory formed by the laser beam 61. The number of sheets overlapped can be confirmed by cutting the battery along a plane parallel to the central axis and observing the welded part. Omitted is a view of the negative electrode active material non-covered part 22 and negative electrode current-collecting plate 25 laser-welded. The number m of sheets overlapped on the negative electrode side is the number of the active material non-covered parts 22C (negative electrode foils) welded immediately below the point at the distance a.

Example

Figure 6A:
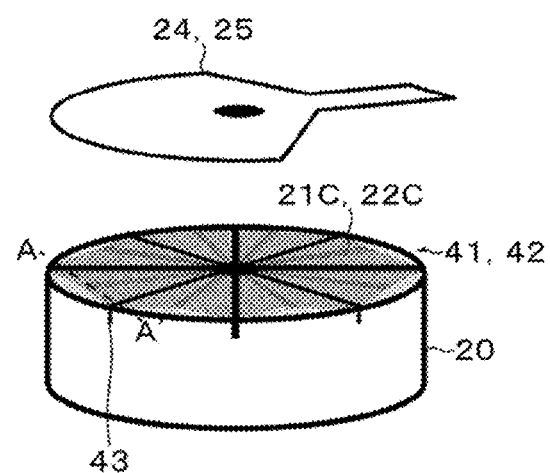
FIG. 6A is an enlarged view of a battery according to an embodiment of the present disclosure.
Figure 6B:
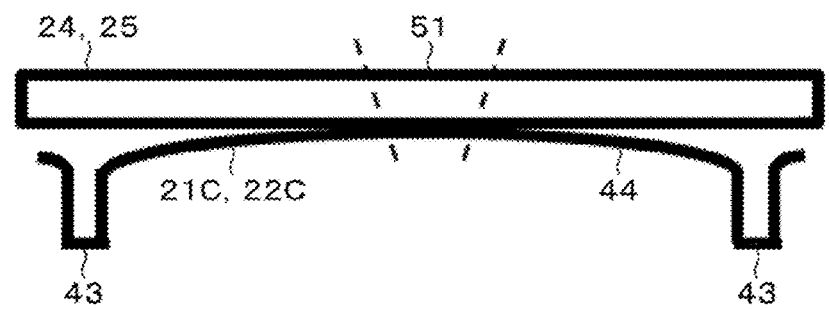
FIG. 6B is a sectional view taken along the AA' cross section of FIG. 6A, and is a view illustrating an example.

FIG. 6A shows an enlarged view (corresponding to the enlarged view of FIG. 4C) of the end 41 or 42 with eight grooves 43 provided and the active material non-covered parts 21C and 22C bent. FIG. 6B shows a sectional view taken along a broken line AA' in FIG. 6A after disposing the current-collecting plate 24 or 25 in an overlapping manner on the end 41 or 42 in FIG. 6A. Laser welding was performed from the side of the current-collecting plate 24 or 25 in the vicinity 51 of the apex of the raised part 44 (region sandwiched by two broken lines in FIG. 6B). As a result, the number of batteries successfully welded was 30 out of 30 batteries.

Comparative Example 1

Figure 7A:
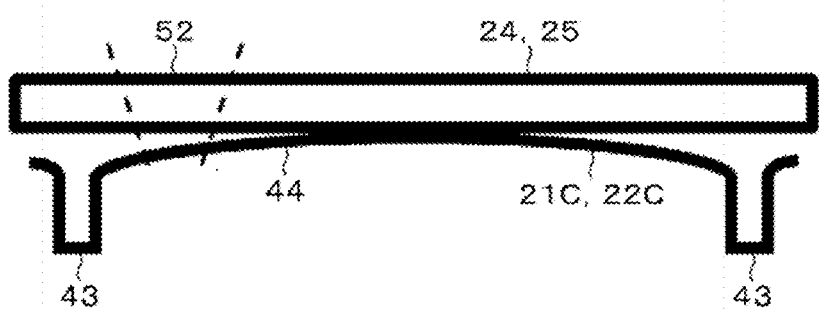
FIGS. 7A and 7B are diagrams illustrating Comparative Example 1.
Figure 7B:
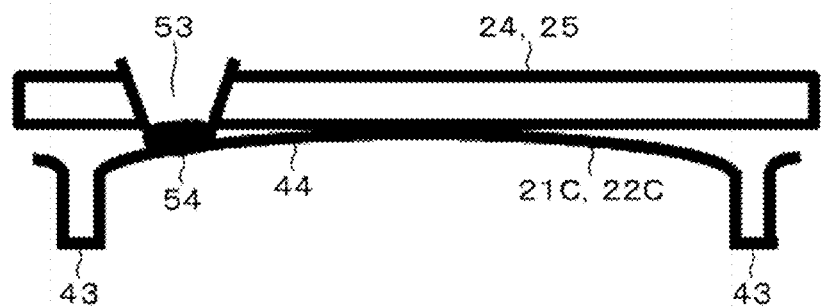

FIG. 7A shows a sectional view taken along a broken line AA' in FIG. 6A after disposing the current-collecting plate 24 or 25 in an overlapping manner on the end 41 or 42 in FIG. 6A. Laser welding was performed from the side of the current-collecting plate 24 or 25 at a part 52 away from the vicinity 51 of the apex of the raised part 44 (region sandwiched by two broken lines in FIG. 7A). As a result, the welding was filed in some cases. In the case where the welding was failed, as shown in FIG. 7B, a perforation 53 was caused by heat of the laser welding in the current-collecting plate, thereby resulting in burn-through 54 of the current-collecting plate or spattering (not shown). The number of batteries successfully welded was 7 out of 30 batteries.

Comparative Example 2

Figure 8A:
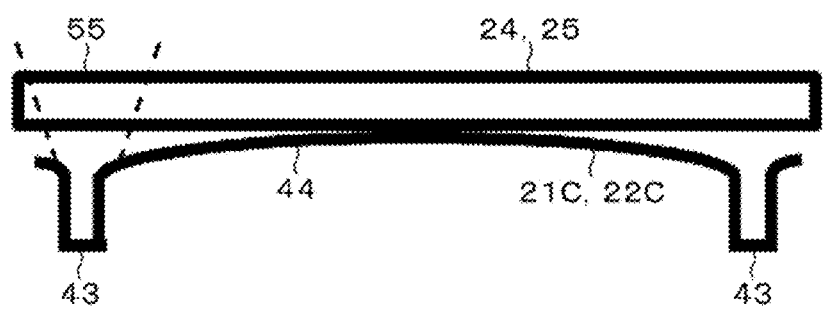
FIGS. 8A and 8B are diagrams illustrating Comparative Example 2.
Figure 8B:
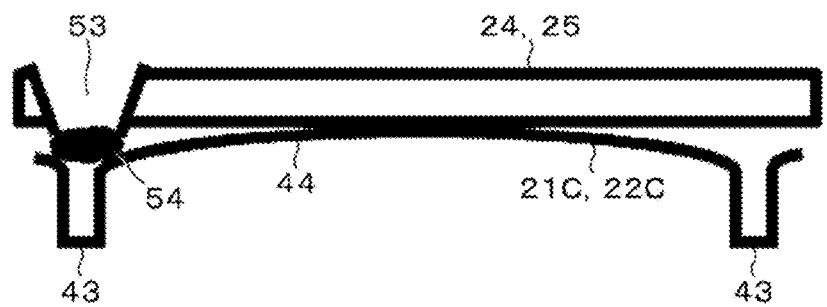

FIG. 8A shows a sectional view taken along a broken line AA' in FIG. 6A after disposing the current-collecting plate 24 or 25 in an overlapping manner on the end 41 or 42 in FIG. 6A. Laser welding was performed from the side of the current-collecting plate 24 or 25 on a side 55 above the groove (region sandwiched by two broken lines in FIG. 8A). As a result, the welding was filed in most cases. In the case where the welding was failed, as shown in FIG. 8B, a perforation 53 was caused by heat of the laser welding in the current-collecting plate, thereby resulting in burn-through 54 of the current-collecting plate or spattering (not shown). The number of batteries successfully welded was 0 out of 30 batteries.

Comparative Example 3

A battery was prepared under the same conditions as in the above-described example except that the numbers of overlapped sheets of the active material non-covered parts 21C and 22C at the ends 41 and 42 were each 1. The current collector plate was perforated or sputtered. The number of batteries successfully welded was 18 out of 30 batteries.

While the embodiment of the present disclosure have been concretely described above, the contents of the present disclosure are not to be considered limited to the embodiment described above, and it is possible to make various modifications based on technical idea of the present disclosure.

Although the number of grooves 43 was 8 in the examples and the comparative examples, other numbers may be employed. The battery size was 21700, but may be 18650 or any other size.

Figure 9:
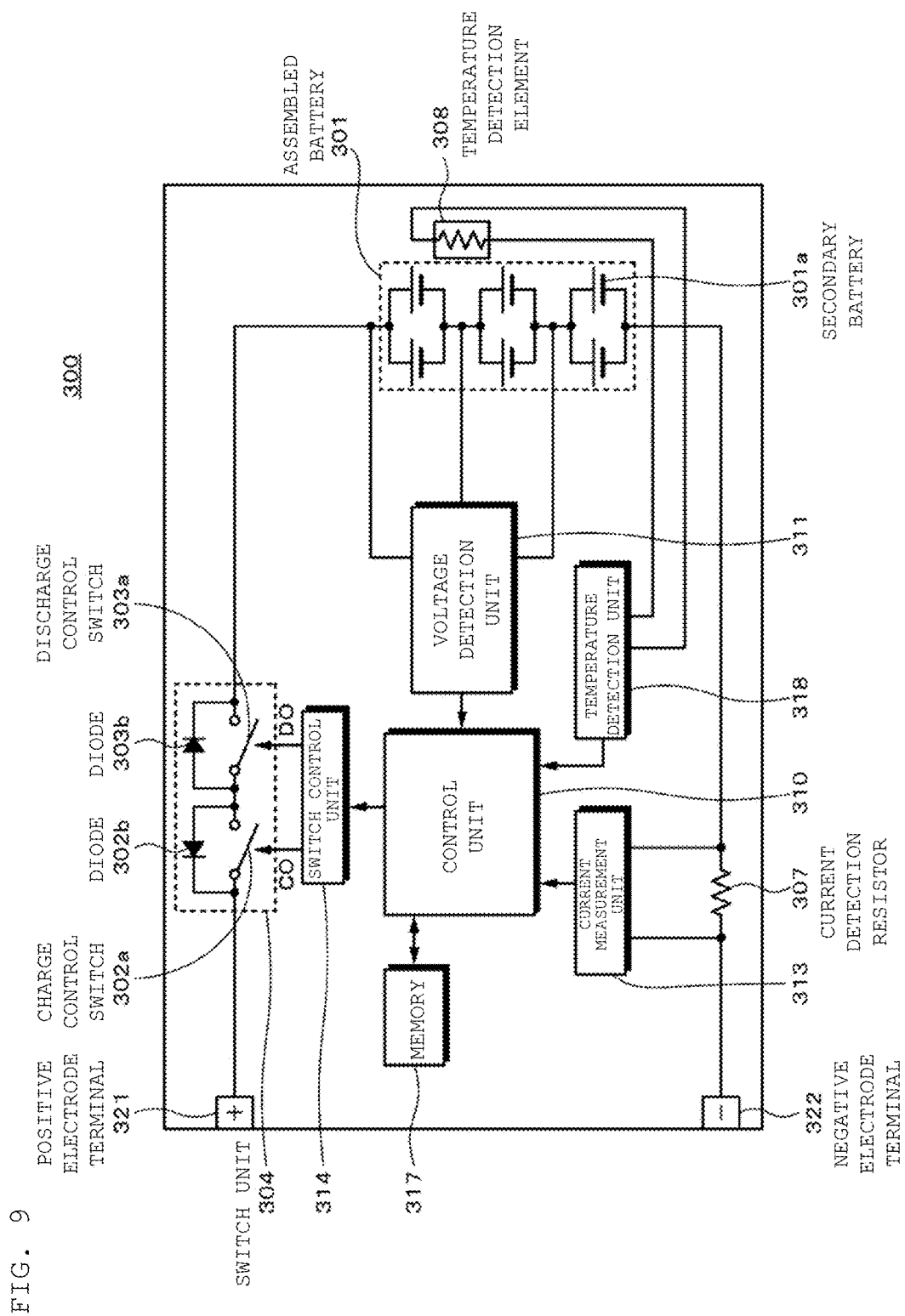
FIG. 9 is a connection diagram for use in description of a battery pack as an application example according to an embodiment of the present disclosure.

FIG. 9 is a block diagram illustrating a circuit configuration example in the case of applying a battery according to an embodiment of the present disclosure (hereinafter, referred to appropriately as a secondary battery) to a battery pack 330. The battery pack 300 includes an assembled battery 301, an exterior, a switch unit 304 including a charge control switch 302a and a discharge control switch 303a, a current detection resistor 307, a temperature detection element 308, and a control unit (controller) 310.

In addition, the battery pack 300 includes a positive electrode terminal 321 and a negative electrode terminal 322, and in the case of charging, the positive electrode terminal 321 and the negative electrode terminal 322 are connected respectively to a positive electrode terminal and a negative electrode terminal of a charger to perform charging. In addition in the case of using an electronic device, the positive electrode terminal 321 and the negative electrode terminal 322 are connected respectively to a positive electrode terminal and a negative electrode terminal of the electronic device to perform discharging.

The assembled battery 301 has a plurality of secondary batteries 301a connected in series and/or in parallel. The secondary battery 301a is a secondary battery according to the present disclosure. It is to be noted that FIG. 9 shows therein a case where six secondary batteries 301a are connected to arrange two batteries in parallel and three batteries in series (2P3S) as an example, but any other connecting method may be employed, such as u in parallel and v in series (u and v are integers).

The switch unit 304 includes the charge control switch 302a and a diode 302b as well as the discharge control switch 303a and a diode 303b, and the switch unit 304 is controlled by the control unit 310. The diode 302b has a polarity in the reverse direction with respect to the charging current flowing in the direction from the positive electrode terminal 321 to the assembled battery 301 and in the forward direction with respect to the discharging current flowing in the direction from the negative electrode terminal 322 to the assembled battery 301. The diode 303b has a polarity in the forward direction with respect to the charging current and in the reverse direction with respect to the discharging current. It is to be noted that the switch unit 304 is provided on the positive side in the example, but may be provided on the negative side.

The charge control switch 302a is turned off if the battery voltage reaches an overcharge detection voltage, and is controlled by a charge/discharge control unit such that no charging current flows through the current path of the assembled battery 301. After the charge control switch 302a is turned off, only discharging is possible through the diode 302b. In addition, the charge control switch 302a is turned off if a large current flows at the time of charging, and is controlled by the control unit 310 so as to cut off a charging current flowing through the current path of the assembled battery 301. The control unit (controller) 310 includes at least one of a central processing unit (CPU), a processor or the like.

The discharge control switch 303a is turned off if the battery voltage reaches an overdischarge detection voltage, and is controlled by the control unit 310 such that no discharging current flows through the current path of the assembled battery 301. After the discharge control switch 303a is turned off, only charging is possible through the diode 303b. In addition, the discharge control switch 303a is turned off if a large current flows at the time of discharging, and is controlled by the control unit 310 so as to cut off a discharging current flowing through the current path of the assembled battery 301.

The temperature detection element 308 is, for example, a thermistor, is provided in the vicinity of the assembled battery 301 to measure the temperature of the assembled battery 301 and supplies the measured temperature to the control unit 310. The voltage detection unit 311 measures the voltages of the assembled battery 301 and of the secondary batteries 301a constituting the assembled battery, performs A/D conversion of the measured voltages, and supplies the converted voltages to the control unit 310. A current measurement unit 313 measures a current with the use of the current detection resistor 307, and supplies the measured current to the control unit 310.

The switch control unit 314 controls the charge control switch 302a and discharge control switch 303a of the switch unit 304, based on the voltages and current input from the voltage detection unit 311 and the current measurement unit 313. When the voltage of any of the secondary batteries 301a becomes equal to or lower than the overcharge detection voltage or the overdischarge detection voltage, or when a large current flows rapidly, the switch control unit 314 transmits a control signal to the switch unit 304 to prevent overcharge, overdischarge, and overcurrent charge.

In this regard, for example, in the case where the secondary battery is a lithium ion secondary battery, the overcharge detection voltage is determined to be, for example, 4.20 V±0.05 V, and the overdischarge detection voltage is determined to be, for example, 2.4 V±0.1 V.

For the charge/discharge switch, for example, a semiconductor switch such as a MOSFET can be used. In this case, the parasitic diode of the MOSFET functions as the diodes 302b and 303b. In the case where a P-channel FET is used as the charge/discharge switch, the switch control unit 314 supplies control signals DO and CO respectively to the respective gates of the charge control switch 302a and discharge control switch 303a. In the case of the P-channel type, the charge control switch 302a and the discharge control switch 303a are turned on by a gate potential that is lower than the source potential by a predetermined value or more. More specifically, in normal charging and discharging operations, the control signals CO and DO are set to a low level to turn on the charge control switch 302a and the discharge control switch 303a.

Then, for example, in overcharge or overdischarge, the control signals CO and DO are set to a high level to turn off the charge control switch 302a and the discharge control switch 303a.

A memory 317 includes a RAM and a ROM, and includes, for example, an EPROM (Erasable Programmable Read Only Memory) that is a nonvolatile memory. In the memory 317, the numerical value calculated by the control unit 310, the internal resistance value of the battery in the initial state for each secondary battery 301a, measured at the stage of the manufacturing process, and the like are stored in advance, and can be also appropriately rewritten. In addition, the full charge capacity of the secondary battery 301a is stored therein, thereby allowing, for example, the remaining capacity to be calculated together with the control unit 310.

A temperature detection unit 318 measures a temperature with the use of the temperature detection element 308, performs charge/discharge control at the time of abnormal heat generation, and performs a correction in the calculation of the remaining capacity.

The above-described battery according to an embodiment of the present disclosure can be mounted on or used to supply electric power to, for example, electronic devices and electric vehicles, electric aircrafts, and devices such as electric storage devices.

Examples of the electronic devices include lap-top computers, smartphones, tablet terminals, PDAs (personal digital assistants), mobile phones, wearable terminals, cordless phone handsets, video movies, digital still cameras, electronic books, electronic dictionaries, music players, radios, headphones, game machines, navigation systems, memory cards, pacemakers, hearing aids, electric tools, electric shavers, refrigerators, air conditioners, televisions, stereos, water heaters, microwave ovens, dishwashers, washing machines, dryers, lighting devices, toys, medical devices, robots, road conditioners, and traffic lights.

Furthermore, examples of the electric vehicles include railway vehicles, golf carts, electric carts, and electric automobiles (including hybrid automobiles), and the battery is used as a driving power supply or an auxiliary power supply for the electric vehicles. Examples of the electric storage devices include power supplies for power storage for buildings such as houses or power generation facilities.

Among the above-described application examples, a specific example of an electric storage system in which an electric storage device with the above-described battery according to the present disclosure applied is used will be described below.

Figure 10:
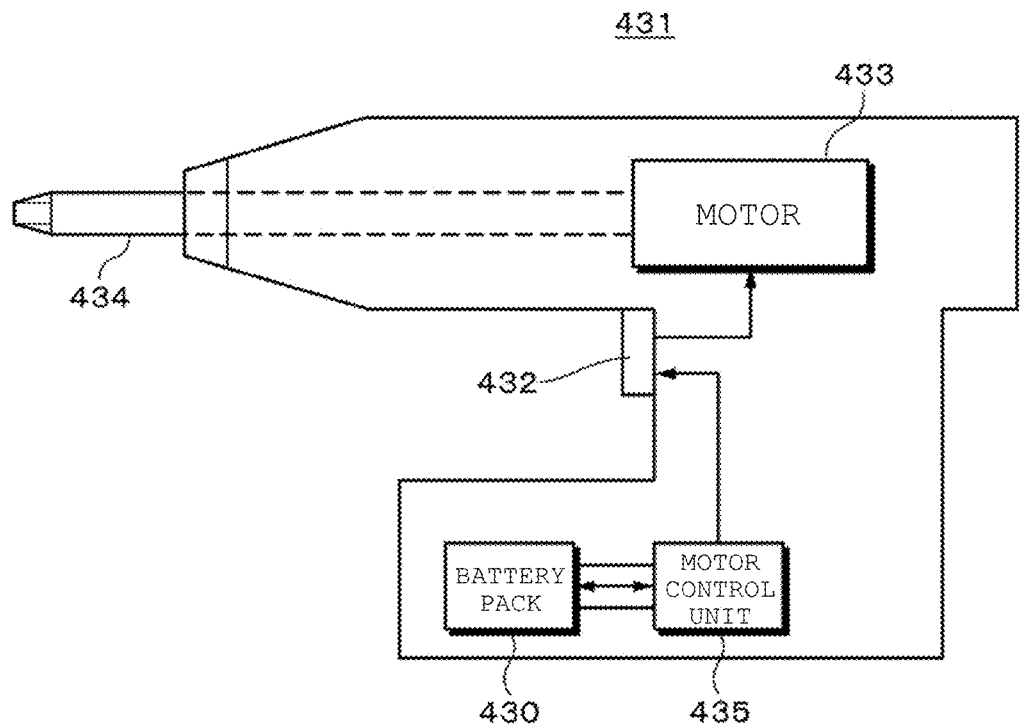
FIG. 10 is a connection diagram for use in description of an electric tool as an application example according to an embodiment of the present disclosure.

An example of an electric tool, for example, an electric driver to which the present disclosure can be applied will be schematically described with reference to FIG. 10. The electric driver 431 has a motor 433 such as a DC motor housed in a main body. The rotation of the motor 433 is transmitted to a shaft 434, and the shaft 434 drives a screw into a target object. The electric driver 431 is provided with a trigger switch 432 operated by a user.

A battery pack 430 and a motor control unit (motor controller) 435 are housed in a lower housing of a handle of the electric driver 431. As the battery pack 430, the battery pack 300 can be used. The motor control unit (motor controller) 435 controls the motor 433. Each unit of the electric driver 431 other than the motor 433 may be controlled by the motor control unit 435. Although not shown, the battery pack 430 and the electric driver 431 are engaged by engagement members provided respectively. As described later, each of the battery pack 430 and the motor control unit (motor controller) 435 includes at least one of a microcomputer, a central processing unit (CPU), a processor or the like. Battery power is supplied from the battery pack 430 to the motor control unit 435, and information on the battery pack 430 is communicated between the microcomputers.

The battery pack 430 is, for example, detachable from the electric driver 431. The battery pack 430 may be built in the electric driver 431. The battery pack 430 is attached to a charging device at the time of charging. It is to be noted that when the battery pack 430 is attached to the electric driver 431, a part of the battery pack 430 may be exposed to the outside of the electric driver 431 to allow the user to visibly recognize the exposed part. For example, the exposed part of the battery pack 430 may be provided with an LED to allow the user to check light emission and non-light emission of the LED.

The motor control unit 435 controls, for example, the rotation/stop and rotation direction of the motor 433. Furthermore, power supply to the load is cut off at the time of overdischarge. For example, the trigger switch 432 is inserted between the motor 433 and the motor control unit 435, and when the user pushes the trigger switch 432, power is supplied to the motor 433 to rotate the motor 433. When the user returns the trigger switch 432, the rotation of the motor 433 is stopped.

Figure 11:
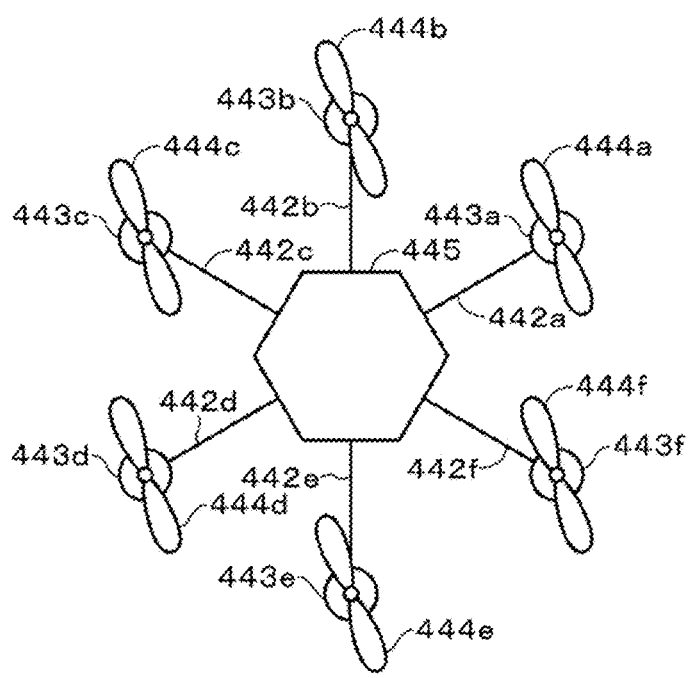
FIG. 11 is a connection diagram for use in description of an unmanned aircraft as an application example according to an embodiment of the present disclosure.

An example in which the present disclosure is applied to a power supply for an electric aircraft will be described with reference to FIG. 11. The present disclosure can be applied to a power supply of an unmanned aircraft (so-called drone). FIG. 11 is a plan view of an unmanned aircraft. The airframe includes a cylindrical or rectangular tube body as a central part, and support shafts 442a to 442f fixed to an upper part of the body. As an example, the body has a hexagonal tubular shape, and the six support shafts 442a to 442f are adapted to extend radially in an equiangular manner from the center of the body. The body and the support shafts 442a to 442f are made of a lightweight and high-strength material.

Motors 443a to 443f as driving sources for rotor blades are attached respectively to tips of the support shafts 442a to 442f. Rotor blades 444a to 444f are attached to the rotation shafts of the motors 443a to 443f. A circuit unit 445 including a motor control circuit (motor controller) for controlling each motor is attached to the central part (the upper part of the body portion) where the support shafts 442a to 442f intersect. The motor control circuit (motor controller) includes at least one of a central processing unit (CPU), a processor or the like.

Furthermore, a battery unit as a power source is disposed at a position below the body. The battery unit includes three battery packs so as to supply electric power the pair of a motor and a rotor blade that have an opposing interval of 180 degrees. Each battery pack includes, for example, a lithium ion secondary battery and a battery control circuit that controls charging and discharging. The battery pack 300 can be used as the battery pack. The motor 443a and the rotor blade 444a form a pair with the motor 443d and the rotor blade 444d. Similarly, (motor 443b and rotor blade 444b) form a pair with (motor 443e and rotor blade 444e), and (motor 443c and rotor blade 444c) form a pair with (motor 443f and rotor blade 444f). These pairs are equal in number to the battery packs.

Figure 12:
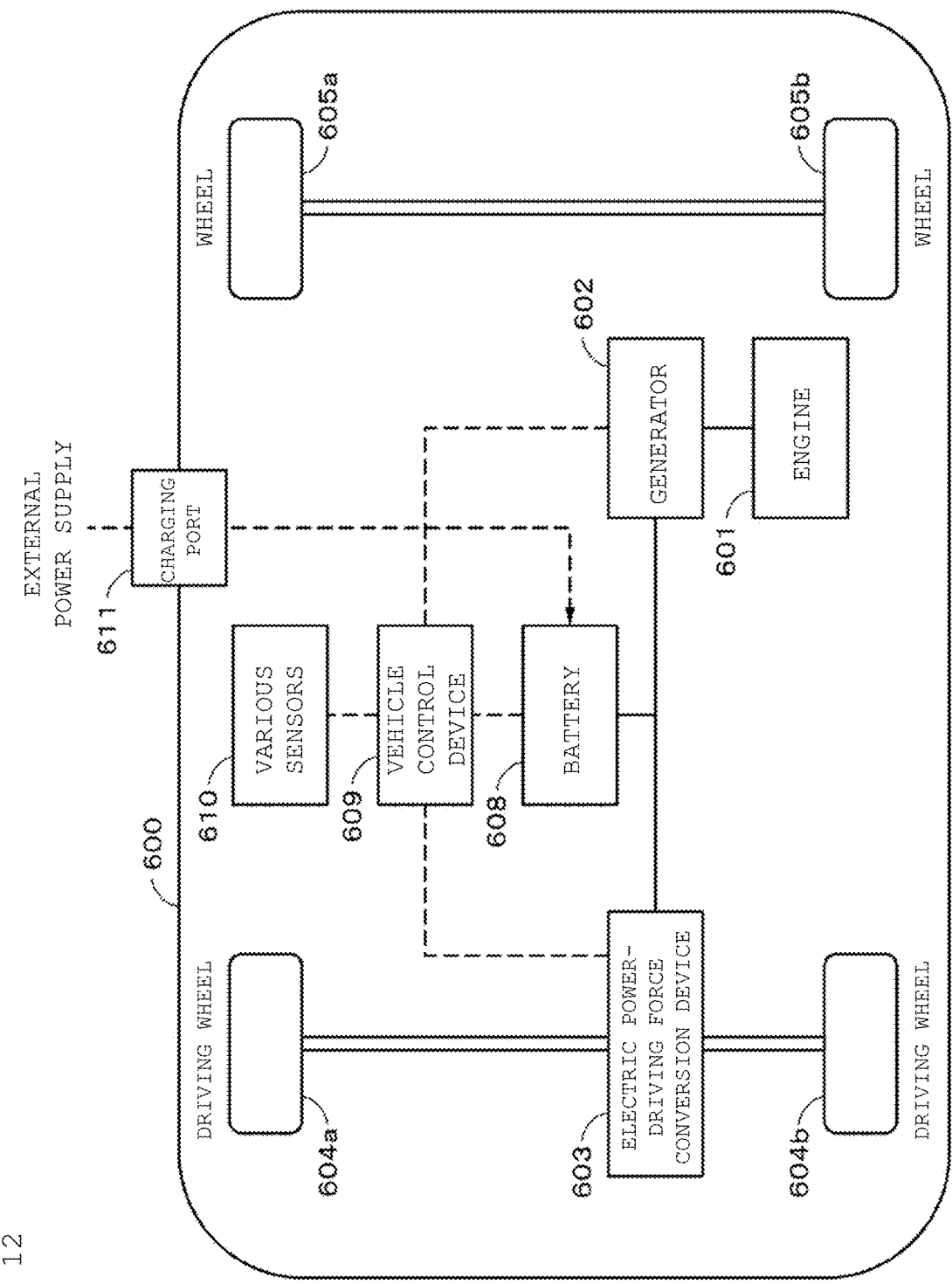
FIG. 12 is a connection diagram for use in description of an electric vehicle as an application example according to an embodiment of the present disclosure.

An example of applying the present disclosure to an electric storage system for an electric vehicle will be described with reference to FIG. 12. FIG. 12 schematically illustrates an example of the configuration of a hybrid vehicle that adopts a series hybrid system to which the present disclosure is applied. The series hybrid system is intended for a vehicle that runs on an electric power-driving force conversion device, with the use of electric power generated by a generator driven by an engine, or the electric power stored once in the battery.

The hybrid vehicle 600 carries an engine 601, a generator 602, the electric power-driving force conversion device 603, a driving wheel 604a, a driving wheel 604b, a wheel 605a, a wheel 605b, a battery 608, a vehicle control device 609, various sensors 610, and a charging port 611. The above-described battery pack 300 according to the present disclosure is applied to the battery 608.

The hybrid vehicle 600 travels with the electric power-driving force conversion device (converter) 603 as a power source. An example of the electric power-driving force conversion device 603 is a motor. The electric power-driving force conversion device 603 is operated by the electric power of the battery 608, and the torque of the electric power-driving force conversion device 603 is transmitted to the driving wheels 604*a* and 604*b*. It is to be noted that the electric power-driving force conversion device 603 can be applied to both an alternate-current motor and a direct-current motor by using direct current-alternate current (DC-AC) or reverse conversion (AC-DC conversion) in a required location. The various sensors 610 control the engine rotation speed via the vehicle control device (vehicle controller) 609, and control the position (throttle position) of a throttle valve, not shown. The various sensors 610 include a speed sensor, an acceleration sensor, an engine rotation speed sensor, and the like. The vehicle control device (vehicle controller) 609 includes at least one of a central processing unit (CPU), a processor or the like.

The torque of the engine 601 is transmitted to the generator 602, and the torque makes it possible to reserve, in the battery 608, the electric power generated by the generator 602.

When the hybrid vehicle 600 is decelerated by a braking mechanism, not shown, the resistance force during the deceleration is applied as torque to the electric power-driving force conversion device 603, and the regenerative electric power generated by the electric power-driving force conversion device 603 is reserved in the battery 608 by the torque.

The battery 608 is connected to a power source outside the hybrid vehicle 600, thereby making it also possible to receive electric power supply from the external power supply with the charging port 611 as an input port, and then reserve the received power.

Although not shown, the vehicle may be provided with an information processing device that performs information processing related to vehicle control, based on information on the secondary battery. Examples of such an information processing device include, for example, an information processing device that displays the remaining battery level, based on information on the remaining level of the battery.

It is to be noted that as an example, the series hybrid vehicle has been described above, which runs on the motor with the use of the electric power generated by the generator driven by the engine, or the electric power stored once in the battery. However, the present disclosure can be also effectively applied to parallel hybrid vehicles which use the outputs of both an engine and a motor as a driving source, and appropriately switch three systems of running on only the engine, running on only the motor, and running on the engine and the motor. Furthermore, the present disclosure can be also effectively applied to so-called electric vehicles that run on driving by only a driving motor without using any engine.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an electrode wound body that has a positive electrode and a negative electrode stacked with a separator interposed therebetween and has a wound structure; and
a positive electrode current-collecting plate and a negative electrode current-collecting plate, wherein the electrode wound body, the positive electrode current-collecting plate and the negative electrode current-collecting plate are accommodated in an exterior can,
wherein the positive electrode includes a first covered part covered with a positive electrode active material layer and a positive electrode active material non-covered part on a positive electrode foil,
the negative electrode comprises a second covered part covered with a negative electrode active material layer and a negative electrode active material non-covered part on a negative electrode foil,
the positive electrode active material non-covered part is joined to the positive electrode current-collecting plate at one end of the electrode wound body,
the negative electrode active material non-covered part is joined to the negative electrode current-collecting plate at the other end of the electrode wound body,
one or both of the positive electrode active material non-covered part and the negative electrode active material non-covered part have a surface formed by bending toward a central axis of the wound structure and overlapping each other,
the surface has grooves,
the surface located between the adjacent grooves includes a raised part raising outward, and
at the raised part, at least the positive electrode active material non-covered part is joined to the positive electrode current-collecting plate or the negative electrode active material non-covered part is joined to the negative electrode current-collecting plate.

2. The secondary battery according to claim 1, wherein a number of overlapped sheets of the positive electrode foil in the positive electrode active material non-covered part, or a number of overlapped sheets of the negative electrode foil in the negative electrode active material non-covered part is 2 or more.

3. The secondary battery according to claim 1, wherein a material of the positive electrode current-collecting plate includes aluminum or an aluminum alloy.

4. The secondary battery according to claim 2, wherein a material of the positive electrode current-collecting plate includes aluminum or an aluminum alloy.

5. The secondary battery according to claim 1, wherein a material of the negative electrode current-collecting plate includes a simple substance of nickel, a nickel alloy, copper, a copper alloy, or a composite thereof.

6. The secondary battery according to claim 1, wherein
a width of the positive electrode active material non-covered part is larger than a width of the negative electrode active material non-covered part,
an end of the positive electrode active material non-covered part and an end of the negative electrode active material non-covered part is protruded outward from the separator, and
a length of a part of the positive electrode active material non-covered part protruded from one end of the separator in a width direction is larger than a length of a part of the negative electrode active material non-covered part protruded from the other end of the separator in the width direction.

7. The secondary battery according to claim 1, wherein a part of the positive electrode active material non-covered part that faces the negative electrode with the separator interposed therebetween has an insulating layer.

8. A battery pack comprising:
the secondary battery according to claim 1;
a controller configured to control the secondary battery; and
an exterior body that encloses the secondary battery.

9. An electronic device comprising the secondary battery according to claim 1.

10. An electronic device comprising the secondary battery according to the battery pack according to claim 8.

11. An electric tool comprising the battery pack according to claim 8,
wherein the electric tool is configured to use the battery pack as a power supply.

12. An electric aircraft comprising:
the battery pack according to claim 8;
a plurality of rotor blades;
a motor that rotates each of the rotor blades;
a support shaft that supports each of the rotor blades and the motor;
a motor controller configured to control rotation of the motor; and
a power supply line that supplies power to the motor,
wherein the battery pack is connected to the power supply line.

13. The electric aircraft according to claim 12, comprising:
a plurality of pairs of the rotor blades facing each other; and
a plurality of the battery packs,
wherein the plurality of pairs of rotor blades and the plurality of battery packs are equal in number.

14. An electric vehicle including the secondary battery according to claim 1, comprising:
a conversion device that receives power supply from the secondary battery to convert the power to a driving force for the electric vehicle; and
a controller configured to perform information processing related to vehicle control, based on information on the secondary battery.

15. The secondary battery according to claim 1, wherein
in the vicinity of the apex of the raised part, the positive electrode active material non-covered part is joined to the positive electrode current-collecting plate and/or the negative electrode active material non-covered part is joined to the negative electrode current-collecting plate.

* * * * *